April 26, 1927.
O. JANZEN
1,626,536
BEARING FOR MOVEMENTS AND DRIVING GEARS
Filed Nov. 27, 1926
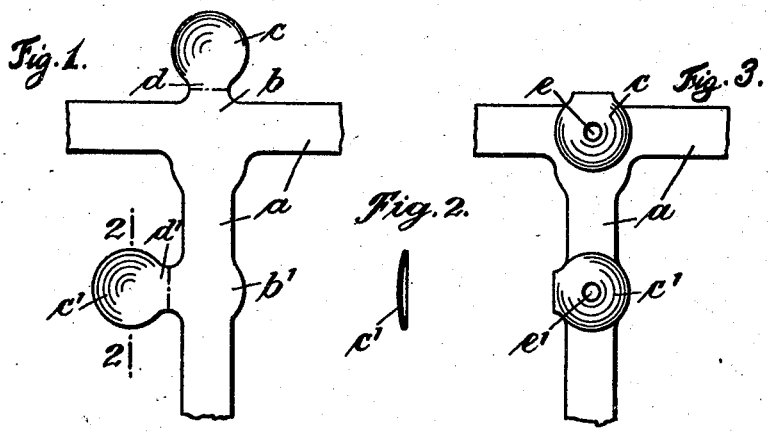
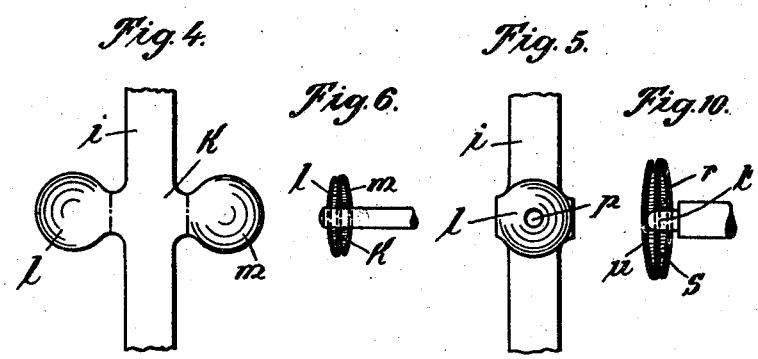
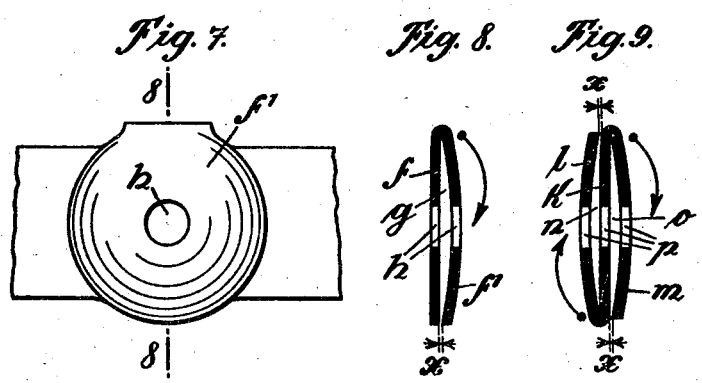

Patented Apr. 26, 1927.

1,626,536

UNITED STATES PATENT OFFICE.

OTTO JANZEN, OF BERLIN, GERMANY.

BEARING FOR MOVEMENTS AND DRIVING GEARS.

Application filed November 27, 1926, Serial No. 151,226, and in Germany December 9, 1925.

For mounting comparatively thin wheels and the like the bearing points of said wheels are thickened or reinforced in such a manner that stamped out flaps having holes form, after having been bent over, a multiple thickening of the simple bearing. Bearings which are thickened in this manner require, owing to their greater friction surface, a more frequent or stronger lubrication. In movements and similar driving gears this stronger and frequent lubricating is impossible owing to the insufficiency of said bearings, so that bearings of this type have not been practically used notwithstanding the advantage which they offer for these gears.

This inconvenience is avoided according to the invention by making the flaps to be bent over more or less hollow according to the lubricating material used and by bending their concave side upon the wheel plate or the like. The hollow spaces which are thus formed serve for storing the oil so that the bearing points are permanently under oil and a steady and perfect working of the movement or driving gear is ensured. It is no longer necessary to take to pieces the driving mechanism after a certain time for oiling the bearing points as the oil in the hollow spaces is sufficient for a permanent lubricating. The oil, owing to its surface tension, cannot escape from these more or less great hollow spaces but nevertheless it is not necessary that the edges of the concave flaps bear tightly upon the plate or the like as by the surface tension of the oil and the narrow interval between the plate and flaps a capillary effect is produced which retains the oil in the hollow space until the last drop has been consumed. It is evident that the shape of the hollow flap to be bent over can be modified according to prevailing conditions.

A form of construction of the bearing improved according to the invention on a plate for electro-magnetic pocket-lamps is shown, by way of example, in the accompanying drawing, illustrating the different forms of construction of a double or triple bearing.

Fig. 1 shows in elevation a stamped out plate with stretched concave bearing flaps.

Fig. 2 is a section on line 2—2 through one of the concave bearing flaps of Fig. 1.

Fig. 3 shows in elevation the finished plate with two double bearings.

Fig. 4 shows in elevation the stamped plate with two concave opposite flaps joining the bearing plate, and for a triple bearing.

Fig. 5 shows in elevation the finished triple bearing.

Fig. 6 is a cross section through the bearing shown in Fig. 5 with an axle traversing said bearing.

Fig. 7 shows in elevation a bearing on larger scale.

Fig. 8 is a section on line 8—8 of Fig. 7 through the double bearing.

Fig. 9 is a similar section through a triple bearing.

Fig. 10 shows on smaller scale a section similar to Fig. 9 of a step bearing for the axle journal.

In the arms of the T-shaped plate $a$ (Fig. 1) the parts $b$ and $b^1$ serving for the bearing have been stamped out rounded in accordance with their purpose. A bearing flap $c$ is connected perpendicularly to the part $b$ by a central web $d$. In a similar manner, a bearing flap $c^1$ is connected in horizontal position with the parts $b^1$ by a web $d^1$.

The two bearing flaps $c$ and $c^1$ are of similar diameter as the parts $b$ and $b^1$. As shown in Fig. 2 in section, these flaps $c$ and $c^1$ are pressed concave and if they are bent over along the dot and dash lines of the webs $d$ and $d^1$ their concave sides rest upon the rounded parts $b$ and $b^1$ so that a hollow space is formed. Through the double bearing formed in this manner the bores $e$ and $e^1$ for the journals are drilled.

Fig. 7 shows in front elevation and Fig. 8 in section on larger scale a bearing of this type, the flap $f^1$ mounted on the plate $f$ having been bent over in the direction of the arrow (Fig. 8) so that a gap $x$ exists between said plate $f$ and the edge of the flap $f^1$, a hollow space $g$ being formed between the flap and the plate. Bores $e$ are then made in the plate $f$ and in flap $f^1$ and the hollow space is filled with lubricating oil. This lubricating oil gets into the narrow gap between plate and flaps and is securely retained in the hollow spaces.

As shown in Figs. 4, 5 and 6 two opposite concave flaps $l$ and $m$ are provided on the plate $i$ at the sides of the part $k$, the flap $l$ showing its concave side and the flap $m$ showing its convex side. These two flaps are bent over as shown in Fig. 9 so that the flap $l$ is bent in the direction of the arrow to the one side, and the flap $m$ is bent in the direction of the arrow to the other side of the plate $k$ so that this part $k$ forms the partition between the two hollow spaces $n$ and $o$, a narrow gap $x$ being formed between the edges of the two flaps and the partition. After the bore $p$ has been made the two hollow spaces are filled with oil. This bearing serves for continuous axles traversing the bearing and journalled in all three walls (Fig. 6). The two bearing flaps $l$ and $m$ might however be displaced 90° the one to the other, if this is necessary.

As shown in Fig. 10 only the one concave flap $r$ and the central partition $s$ are bored to receive the axle journal $t$ which bears against the concave surface of the flap $u$.

Plates, frame skeletons, wheels and the like can be fitted in this manner with double or triple lubricating bearings so that, in all cases, for each axle journal or shaft a corresponding lubrication is provided as, owing to the surface tension of the oil and owing to the narrow gaps between the plates and the concave flaps a capillary effect is produced which retains the oil to the last drop.

I claim:—

A bearing for movements and driving gears which is several times reinforced by stamped out flaps having holes and bent over, in which said flaps are hollow and bear with their concave sides on the plate so that between the plate and the flap an oil chamber is formed in which the oil is retained by the capillary effect.

In testimony whereof I affix my signature.

OTTO JANZEN.